(12) United States Patent
Pedersen

(10) Patent No.: US 11,022,092 B2
(45) Date of Patent: Jun. 1, 2021

(54) METHOD AND A SYSTEM FOR MOUNTING A ROTOR TO A DRIVE SHAFT OF A WIND TURBINE

(71) Applicant: Vestas Wind Systems A/S, Aarhus N. (DK)

(72) Inventor: Gunnar K. Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 353 days.

(21) Appl. No.: 16/060,092

(22) PCT Filed: Dec. 19, 2016

(86) PCT No.: PCT/DK2016/050444
§ 371 (c)(1),
(2) Date: Jun. 7, 2018

(87) PCT Pub. No.: WO2017/108052
PCT Pub. Date: Jun. 29, 2017

(65) Prior Publication Data
US 2018/0372063 A1    Dec. 27, 2018

(30) Foreign Application Priority Data

Dec. 22, 2015 (DK) .......................... PA 2015 70863

(51) Int. Cl.
*F03D 1/06* (2006.01)
*B66C 1/10* (2006.01)
(Continued)

(52) U.S. Cl.
CPC ............ *F03D 1/0658* (2013.01); *B66C 1/108* (2013.01); *B66C 1/12* (2013.01); *B66C 1/18* (2013.01);
(Continued)

(58) Field of Classification Search
CPC ......... F03D 13/10; F03D 13/20; B66C 1/108; B66C 1/12; B66C 1/122; B66C 1/18; B66C 23/185; B66C 13/04; B66C 13/08
See application file for complete search history.

(56) References Cited

U.S. PATENT DOCUMENTS 3,841,498 A * 10/1974 Heidrich .................. B66C 1/18
                                                          414/756
4,350,380 A *  9/1982 Williams ................. B66C 1/18
                                                           294/74
(Continued)

FOREIGN PATENT DOCUMENTS

CN      101670975 A    3/2010
CN      202848861 U    4/2013
(Continued)

OTHER PUBLICATIONS

China National Intellectual Property Administration, First Notification of Office Action in CN Application No. 201680075094.6, dated May 13, 2019.
(Continued)

*Primary Examiner* — Christopher M Koehler
(74) *Attorney, Agent, or Firm* — Wood Herron & Evans LLP

(57) ABSTRACT

A method for mounting a rotor to a drive shaft of a wind turbine, the method comprising placing a hub on a surface, attaching a first, a second, and a third rotor blade to the hub to thereby make a rotor in situ. To protect the blades and to avoid fixed lifting lugs on the rotor, the method includes the step of wrapping a sling about each of the blades, attaching each sling to a fitting, lifting each fitting to thereby raise the rotor from the surface, and attaching the rotor to the drive shaft while the position and orientation of the rotor is controlled by the slings.

19 Claims, 7 Drawing Sheets

(51) Int. Cl.
*F03D 13/10* (2016.01)
*B66C 1/12* (2006.01)
*B66C 1/18* (2006.01)

(52) U.S. Cl.
CPC .............. *F03D 1/06* (2013.01); *F03D 13/10* (2016.05); *F05B 2230/61* (2013.01); *Y02E 10/72* (2013.01); *Y02P 70/50* (2015.11)

(56) References Cited

U.S. PATENT DOCUMENTS

| | | | | |
|---|---|---|---|---|
| 4,492,399 | A * | 1/1985 | Randen | B66C 1/18 294/74 |
| 5,205,544 | A * | 4/1993 | Kroeger | B66C 13/08 254/329 |
| 2003/0183594 | A1* | 10/2003 | Torres Martinez | B66C 23/32 212/196 |
| 2005/0019166 | A1* | 1/2005 | Bervang | B66C 13/08 416/244 A |
| 2007/0151194 | A1* | 7/2007 | Livingston | F03D 13/10 52/651.05 |
| 2008/0078128 | A1* | 4/2008 | Livingston | F03D 13/10 52/40 |
| 2008/0216301 | A1 | 9/2008 | Hansen et al. | |
| 2011/0220538 | A1* | 9/2011 | Nies | F03D 13/40 206/525 |
| 2011/0221215 | A1* | 9/2011 | Botwright | B66C 23/36 294/81.4 |
| 2012/0027561 | A1* | 2/2012 | Riddell | B66C 1/18 414/800 |
| 2012/0308338 | A1* | 12/2012 | von Ahn | B66C 1/108 414/10 |
| 2013/0045110 | A1* | 2/2013 | Wagner | B66C 1/62 416/244 R |
| 2015/0232307 | A1* | 8/2015 | Holloway | F03D 80/50 414/800 |
| 2015/0233341 | A1* | 8/2015 | Neumann | F03D 13/10 414/800 |
| 2015/0300313 | A1* | 10/2015 | Choi | F03D 13/10 29/889.1 |
| 2020/0140236 | A1* | 5/2020 | Petersen | B66C 1/12 |

FOREIGN PATENT DOCUMENTS

| | | |
|---|---|---|
| CN | 103193151 A | 7/2013 |
| DE | 202010004093 U1 | 5/2011 |
| EP | 1748186 A1 | 1/2007 |
| EP | 2154366 A1 | 2/2010 |
| WO | 2011026970 A2 | 3/2011 |
| WO | 2014076826 A1 | 5/2014 |

OTHER PUBLICATIONS

Danish Patent and Trademark Office, Search and Examination Report in PA 2015 70863, dated Aug. 15, 2016.
European Patent Office, International Search Report and Written Opinion in PCT Application Serial No. PCT/DK2016/050444, dated Apr. 3, 2017.

* cited by examiner

METHOD AND A SYSTEM FOR MOUNTING A ROTOR TO A DRIVE SHAFT OF A WIND TURBINE

TECHNICAL FIELD

The present invention relates to manufacturing of wind turbines, and particularly to a method and a system for mounting a rotor to a drive shaft of a wind turbine.

Wind turbines, particularly horizontal axis wind turbines, comprise a tower and a nacelle, the nacelle is typically rotatable at a top end of the tower and carries a drive shaft and a rotor. The rotor drives a drive shaft which again drives a power generator for generating electrical power.

The rotor comprises a hub and a number of blades attached to the hub. Additionally, the rotor may comprise a spinner forming an aerodynamic tip facing the wind in front of the hub.

Recently, the size of wind turbines has increased with the growing demand for power and efficiency Modern wind turbines are very large, and the rotor may span more than hundred meters. Typically, the wind turbines are made on location by erecting a tower and lifting the nacelle without the rotor to the tower top. This operation is carried out by use of a crane. The hub is often lifted in one piece and attached to the rotor shaft. Subsequently, each blade is lifted individually and attached to the hub.

The lifting operation is normally complex and expensive, not least due to the need for very large cranes.

DESCRIPTION OF THE INVENTION

It is an object of embodiments of the invention to reduce the complexity in wind turbine manufacturing, particularly related to handling and attachment of the rotor to the rotor shaft.

According to this and other objects, the invention, in a first aspect, provides a method for mounting a rotor to a drive shaft of a wind turbine, the method comprising placing a hub on a surface, attaching a first, a second, and a third rotor blade to the hub to thereby make a rotor in situ, wrapping a sling about each of the blades, attaching each sling to a fitting, lifting each fitting to thereby raise the rotor from the surface, and attaching the rotor to the drive shaft while the position and orientation of the rotor is controlled by the slings.

In a second aspect, the invention provides a system for mounting a rotor to a drive shaft of a wind turbine, the system comprising at least three slings each being suitable for being wrapped about a blade, a fitting for attaching the slings to a crane cable, and an actuator for changing the distance between the fitting and one of the slings to thereby enable controlling of the orientation of a rotor which is lifted by a sling about each blade.

Since the rotor is lifted by slings about each of the blades, the rotor can be lifted efficiently and safely without having to rig the rotor with fixed lifting lugs and other equipment which will have to be removed after the lifting operation. Accordingly, the lifting operation can be finalised simply by releasing the slings. This can be done remotely, or at least without having to carry out time consuming or expensive repair work on the rotor in an attempt to remove fixed lifting lugs.

Since the process requires no amendment of the rotor with fixed lifting lugs, the process leaves no visual marks on the rotor.

Herein, the term "rotor" is used to express the unit attached to the drive shaft and comprising the hub, the blades and optionally additional component such as blade pitching components, spinner, lightening protecting components etc.

The term "shaft" expresses the drive shaft of the wind turbine, i.e. that shaft being driven by the rotor and which drives a power generator or other components e.g. through a gearbox.

The wind turbine to which the invention relates may be a horizontal or near horizontal axis wind turbine, and particularly a wind turbine of the kind where the rotor comprises three blades offset in the range of 120 degrees relative to each other. The invention is particularly useful in large wind turbines, e.g. in wind turbines having an effect above 1 MW or even above 2 or 3 MW.

Particularly, the invention may be used in combination with nacelle constructions where the nacelle is rotatable relative to the tower to thereby let the rotor face the wind. In such wind turbines, the turbine noise emission may be in any direction depending on the wind, and the masking sound may efficiently reduce particularly the tonal component of the turbine noise.

The step of attaching the rotor to the drive shaft is performed in a standard procedure known in the art, however, during this procedure the position and orientation of the rotor is controlled by the slings. Particularly, the method may depend entirely on the slings to hold and orient the rotor such that no other elements are applied. Particularly, the method may be carried out without bolting, welding or otherwise fixing elements to the rotor.

To improve the ability to reorient the rotor by use of the slings and to prevent slipping between the slings and the blades, at least one of the slings and preferably all slings may be wrapped two or more turns around the blade, i.e. more than 360 degrees about a rotor blade.

The orientation of the rotor may be controlled by changing the distance from the fitting to one of the rotor blades. This rotor blade will in the following be referred to as "a controlled rotor blade". The distance may e.g. be varied within the range of 50-150 percent of the distance between the fitting and the other blades, such as in the range between 75-125 percent.

The distance from the fitting to the controlled rotor blade can be changed by changing the distance between the fitting and that sling which is wrapped about the controlled blade or by changing the length of that sling. In the following we refer to this sling as "a controlled sling".

The distance could be changed by use of a power driven actuator, e.g. a hydraulic or electric linear actuator.

At least one sling, and preferably all slings may be attached to the fitting via a pulley block allowing the slings to roll back and forth independent on the orientation of the fitting. In one embodiment, the pulley block may be controllable, e.g. so that that each pulley block can be blocked independently to prevent individual slings from moving relative to the fitting.

The power driven actuator could be attached between the fitting and the pulley block of the controlled sling such that the sling can move relative to the power driven actuator through the pulley block.

The rotor could be protected against contact with the controlled sling by a shield which is removed from the rotor when the rotor is mounted to the drive shaft. The shield may particularly cover a portion of the tip of the hub or it may cover a portion of a spinner, if a spinner is attached to the hub.

The shield may e.g. form a sheet of metal, composite, or plast-material. The shield may e.g. be held in place by the controlled sling, or it may be held in place by other means, e.g. adhesively to an outer surface of the hub or spinner, or by straps etc.

All slings could be attached to a single fitting, and all slings may particularly be lifted from one single location. As an example, the fitting may assemble all slings in one single point from which the crane cable can lift the rotor. In this way, the slings may form a relatively large angle to each other, e.g. an angle above 10 degrees.

In an alternative embodiment, the slings may be held e.g. by a lifting lug at distance from each other. In that way, the slings may extend with a smaller angle relative to each other, e.g. below 10 degrees, or even parallel to each other.

All slings may be attached to a single fitting which is again lifted e.g. by a crane cable.

The rotor typically forms a flange for attachment to the drive shaft and thereby defines a rotor axis about which the rotor is configured to rotate when attached to the drive shaft. the method according to this invention may include using a stand for the rotor such that the rotor and particularly the flange is lifted from the surface. This not only facilitates wrapping the slings about the blades, it also protects the blades against contact with the surface or ground if the rotor tilts slightly.

In a second aspect, a system for mounting a rotor to a drive shaft of a wind turbine is provided. The system comprises a sling for each blade of the rotor, a fitting for attaching the slings to a crane cable, and an actuator for changing the distance between the fitting and one of the slings to thereby enable controlling of the orientation of a rotor which is lifted by a sling about each blade. The fitting may e.g. be a crane hook, and the actuator may be a hydraulic actuator.

The system may further comprise a shield which is attachable to the rotor or to one of the slings and which is suitable for protecting the rotor against contact with a sling. The shield may a curved track for receiving one of the slings during reorientation of the rotor. The shield may particularly be a sheet of a steel, composite, or plastic material, and the curved track may be formed by the shape of the shield. Particularly, the track may e.g. be formed by bended edge portions of the shield such that the controlled sling is held on the shield between the bended edges.

DETAILED DESCRIPTION OF THE DRAWINGS

The invention will now be described in further details with reference to the accompanying drawings, wherein.

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
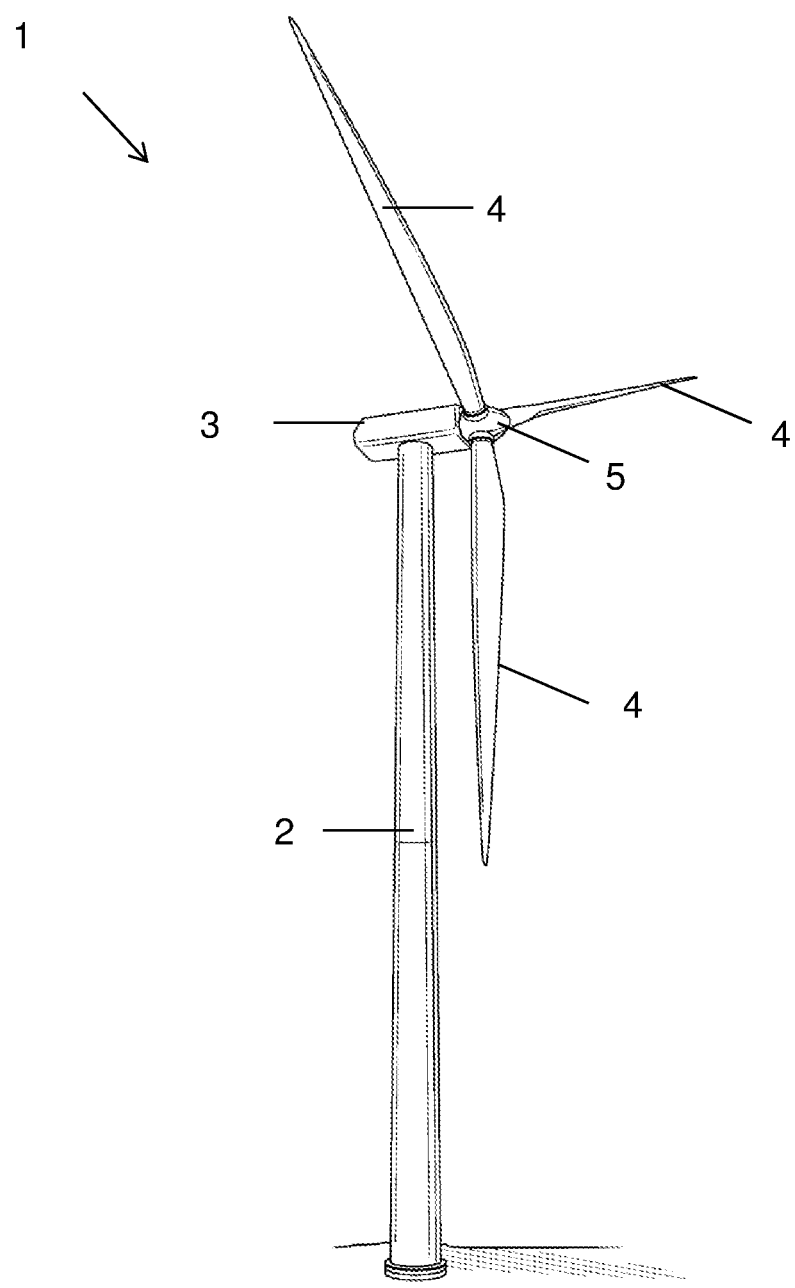
FIG. 1 illustrates a wind turbine with a tower and a nacelle.

FIG. 1 illustrates a wind turbine 1 with a tower 2, a nacelle 3, a rotor including three blades 4 and a hub covered with a spinner 5

Figure 2:
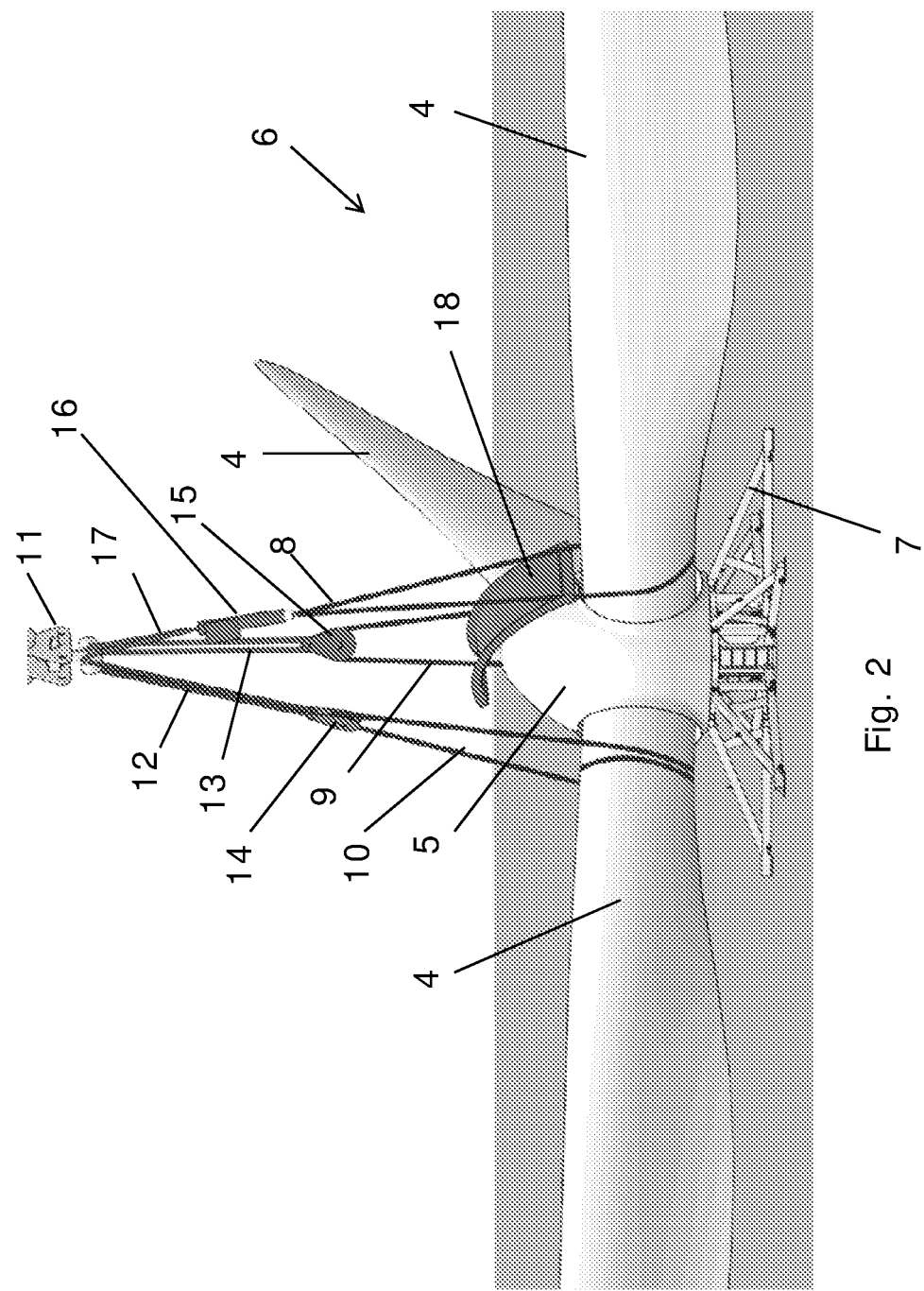
FIG. 2 illustrates a rotor placed on ground in a stand ready to be lifted.

FIG. 2 illustrates the rotor 6 of the wind turbine before it is attached to the drive shaft in the nacelle. The rotor comprises a hub covered by a spinner 5 and the three blades 4. The rotor is placed in a stand 7 on ground surface.

A first, second, and third sling 8, 9, 10 is wrapped about the blades. The slings are attached to a fitting, in this embodiment in the form of a lifting hook 11. Two of the slings are connected to the hook via robes 12, 13 and the pulley blocks 14, 15. The last sling 8, herein referred to as the controlled sling, is connected to the fitting via an actuator 16 and a robe 17.

Two of the slings 9, 10 are wrapped two turns around the corresponding blade, and the controlled sling 8 is wrapped only one turn about the controlled blade.

The system includes a shield 18 which protects against direct contact between the hub or the spinner and the slings, particularly the controlled sling 8. Typically, the hub is covered with a spinner having a smooth and aerodynamic appearance. The spinner is typically arranged directly against the hub. To protect the spinner, or to protect the hub, the shield is arranged against the outer surface of the hub or spinner and formed such that the controlled sling is guided by the shield and remains on the surface of the shield. The guiding may be insured by bended edges of the shield such that the shield forms a track between two edges, e.g. parallel edges, in which track the sling may contact the shield during reorientation of the rotor.

Figure 3:
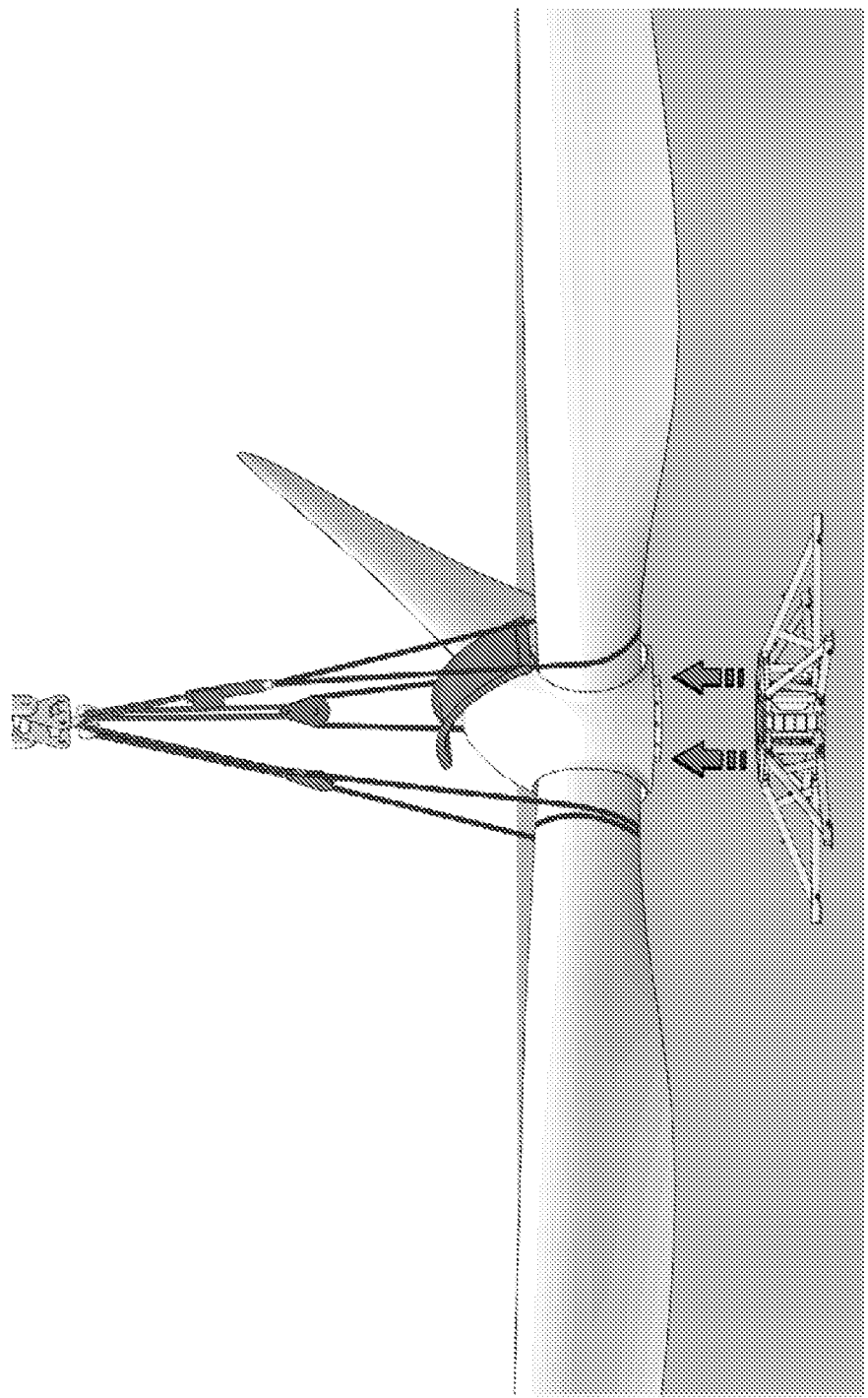
FIG. 3 illustrates the rotor when lifted free from the stand.

FIG. 3 illustrates when the rotor is lifted free from the stand. In this view, the orientation is not yet changed.

Figure 4:
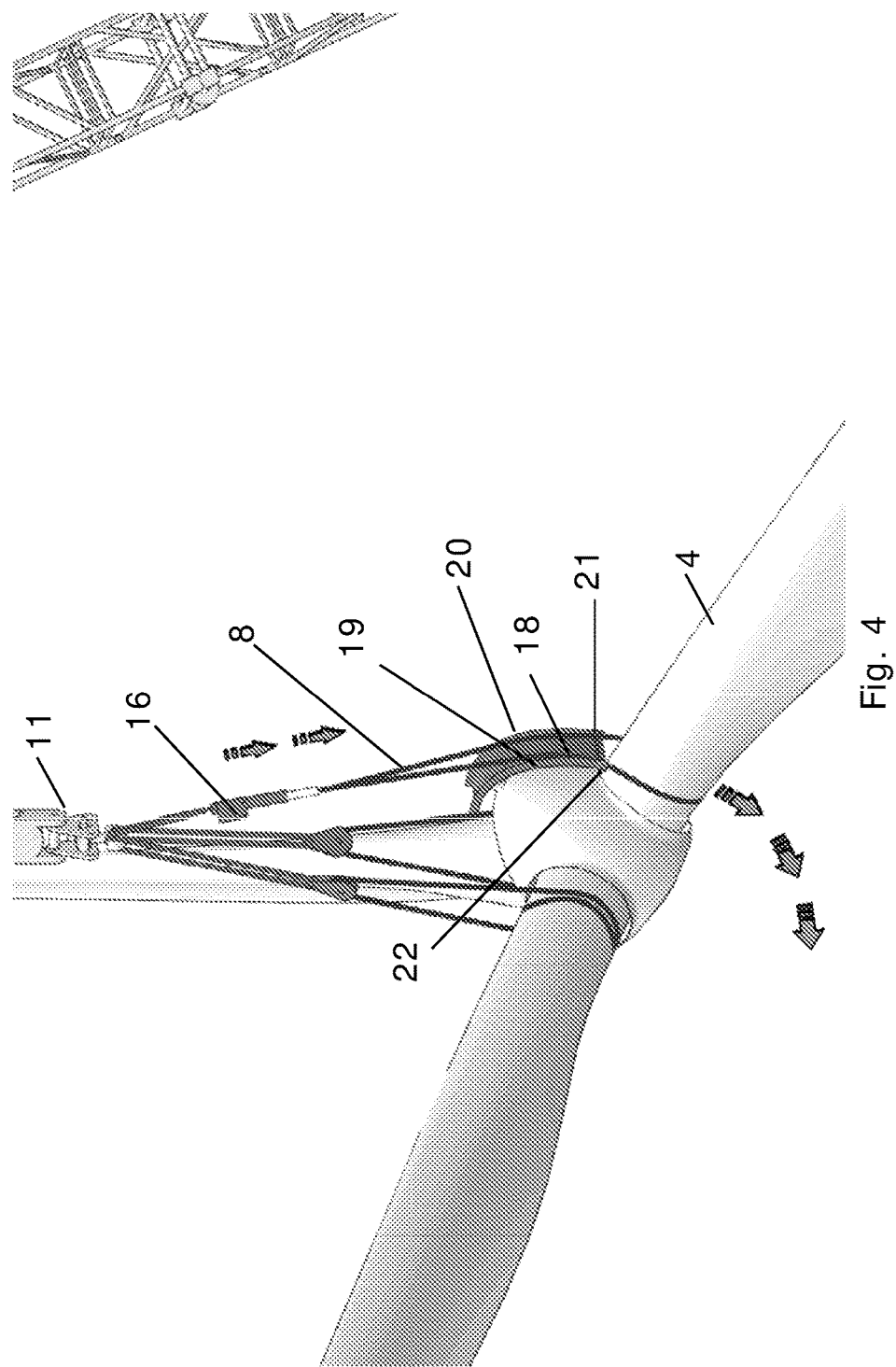
FIG. 4 illustrates the step of reorienting the rotor by use of an actuator extending the distance from the fitting to the controlled blade.

In FIG. 4, the orientation of the rotor is controlled by operation of the power driven actuator 16, thereby changing the distance from the fitting to the controlled rotor blade 4. The power driven actuator can be controlled by a controller which obtains orientation parameters from a sensor, e.g. a gyro, and by which a desired orientation can be selected. The actuator 16 may be operated simultaneously with the lifting of the rotor.

When the rotor is tilted, the shield protects the hub or a spinner attached to the hub. The shield forms bended edges 19, 20 holding the slings along the centre track of the shield and thus preventing the controlled sling 8 from sliding away from the shield.

The shield is held by the sling at the points 21, 22 where the sling penetrates through holes in the shield.

Figure 5:
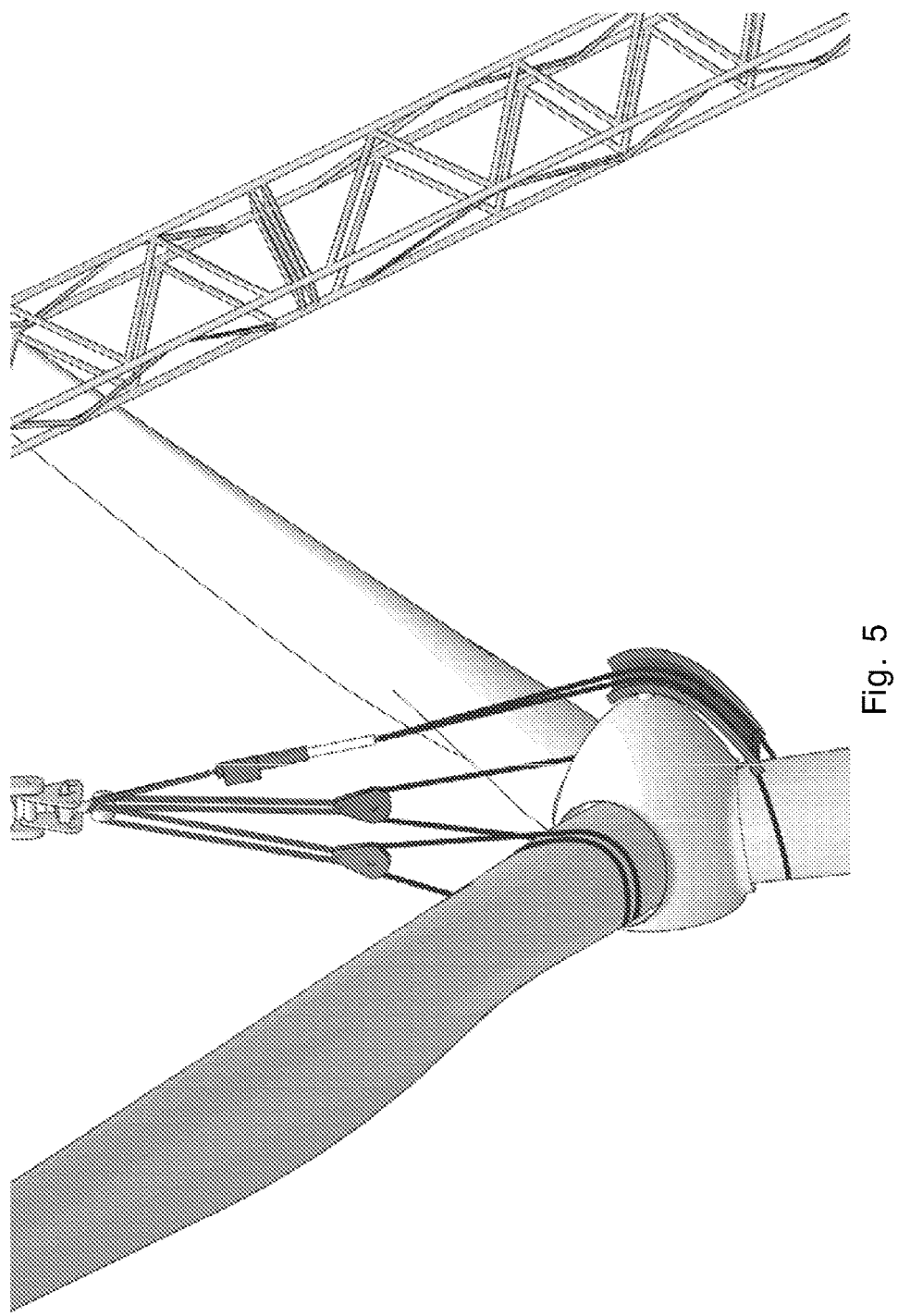
FIG. 5 illustrates the rotor in an orientation ready for attachment to a drive shaft.

FIG. 5 illustrates the rotor in an orientation ready for attachment to the drive shaft; in the nacelle.

Figure 6:
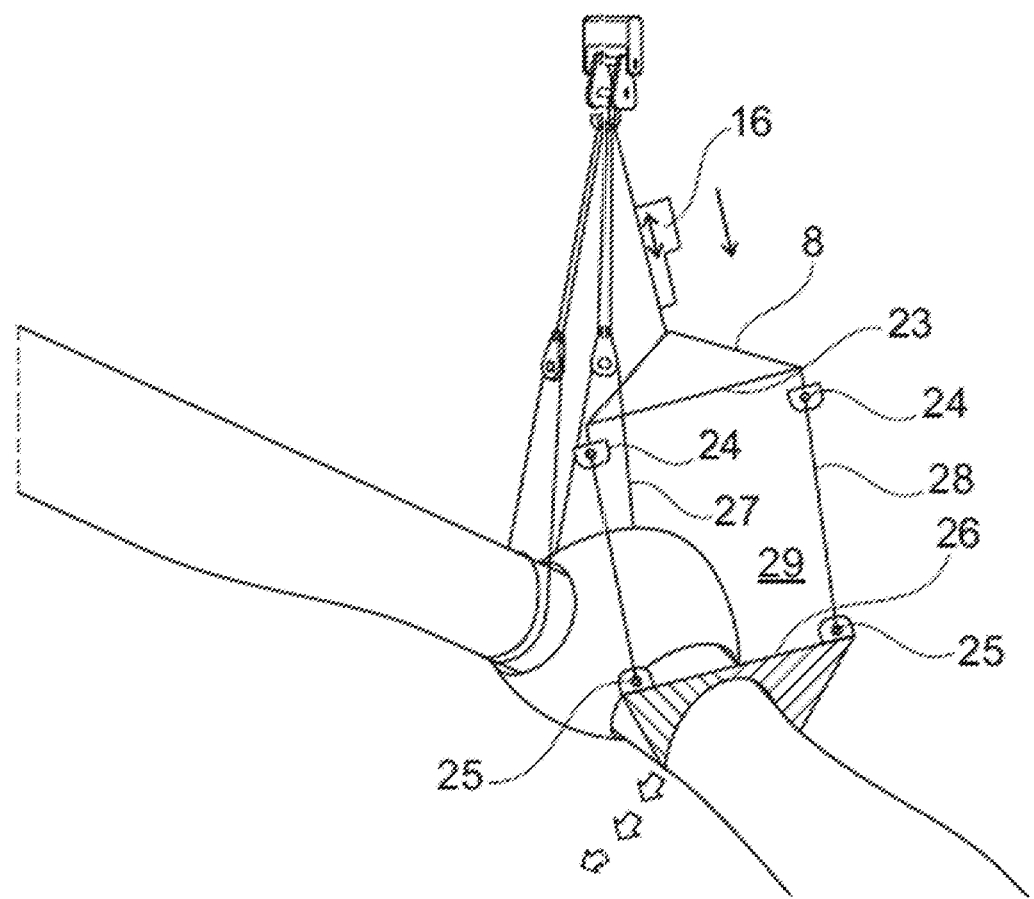
FIG. 6 illustrates an embodiment of the controlled sling.

FIG. 6 illustrates an embodiment where the controlled sling 8 is held by a spreader structure. The spreader structure comprises a lifting yoke 23 with pulley blocks 24. The controlled sling runs through the pulley blocks 24 and through the eyelets 25 at the lower carry beam 26. The yoke and lower carry beam maintains a distance between the rights and left sides 27, 28 of the controlled sling, and thereby protects the controlled blade. Particularly, the spinner, and/or the hub may enter into the open window 29 formed between the right and left sides 27, 28 of the controlled sling. Accordingly, the shield which protects the spinner from contact with the sling is not necessary.

I one embodiment, the spreader structure is combined with the protective shield, and in one embodiment, the protective shield is suspended by the sling within the window 29.

The actuator 16 may, as illustrated be arranged above the yoke, or alternatively, it can be arranged between the yoke and the lower carry beam to thereby increase or decrease the length of the open window 29.

In this embodiment, the controlled sling 8 could be in two distinct sections, e.g. formed by two separate robes, or belts, where one of the two distinct sections connect to the lifting yoke 23 and pulley blocks 24 and optionally to the lower carry beam 26, and the other one of the two distinct sections connect to the lower carry beam only.

In one embodiment, the yoke and the lower carry beam is formed in one piece, e.g. in the form of a frame of 4 steel bars joined to form a quadrangular shape. In another embodiment, the spreader structure is constituted by or comprises a ring shaped, e.g. a circular structure, e.g. made of steel, and arranged to receive the spinner or hub during reorientation of the rotor.

Figure 7:
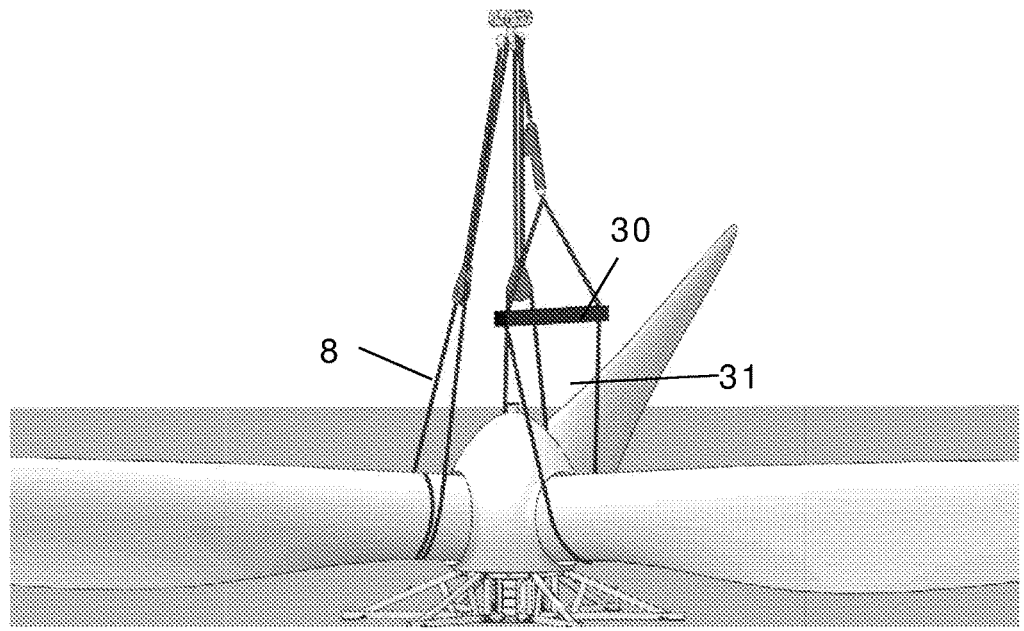
FIG. 7 illustrates an alternative embodiment of a controlled sling with a rotor in a stand ready to be lifted.
Figure 8:
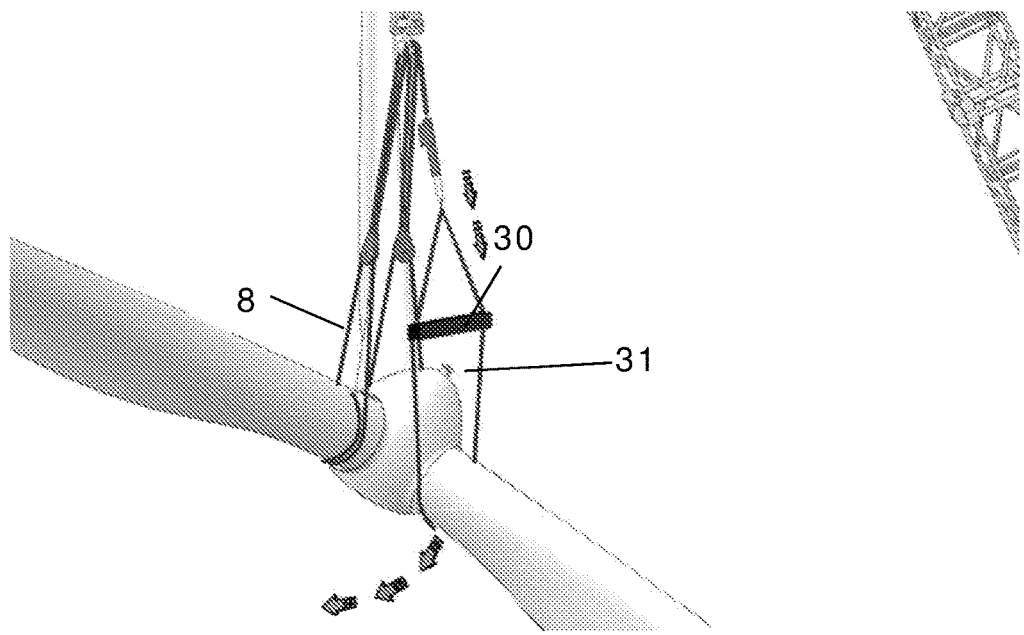
FIG. 8 illustrates the step of reorienting the rotor using the controlled sling of FIG. 7.

FIGS. 7 and 8 illustrate an alternative embodiment in which the controlled sling 8 is held by a single spreader 30. The spreader forms an eyelets 31 in which the controlled blade is carried and it allows the spinner to be received into the eyelet when the rotor is rotated. The length of the single spreader 30 may e.g. correspond at least to the diameter of the spinner at the cross section where the blades are attached. Accordingly, the shield which protects the spinner from contact with the sling is not necessary.

The invention claimed is:

1. A method for mounting a rotor to a drive shaft of a wind turbine, the method comprising:
   supporting a hub on a surface,
   attaching a first, a second, and a third rotor blade to the hub to thereby make the rotor in situ,
   wrapping a first, a second, and a third sling about the first, the second, and the third rotor blades, respectively, adjacent a root end of the first, the second, and the third rotor blades,
   attaching each of the first, the second, and the third slings to one or more fittings,
   lifting the one or more fittings to thereby raise the rotor from the surface, and
   attaching the rotor to the drive shaft while the position and orientation of the rotor are controlled by the first, the second, and the third slings.

2. The method according to claim 1, wherein at least one of the first, the second, and the third slings is wrapped more than 360 degrees about its respective rotor blade.

3. The method according to claim 1, wherein the orientation of the rotor is controlled by changing a distance from the at least one fitting to one of the first, the second, or the third rotor blades which thereby becomes a controlled rotor blade.

4. The method according to claim 3, wherein the distance from the at least one fitting to the controlled rotor blade is changed by changing a distance between the at least one fitting and the respective one of the first, the second, or the third sling which is wrapped about the controlled blade, the respective one of the first, the second, or the third sling thereby becoming a controlled sling.

5. The method according to claim 4, wherein the distance between the at least one fitting and the controlled sling is changed by use of a power driven actuator.

6. The method according to claim 5, wherein the controlled sling is attached to the at least one fitting via a pulley block, and wherein the power driven actuator is attached between the at least one fitting and the pulley block of the controlled sling.

7. The method according to claim 4, wherein the rotor is protected against contact with the controlled sling by a shield which is removed from the rotor when the rotor is mounted to the drive shaft.

8. The method according to claim 7, wherein the shield is held by the controlled sling.

9. The method according to claim 1, wherein the at least one fitting is a single fitting, and wherein each of the first, the second, and the third slings is attached to the single fitting.

10. The method according to claim 9, wherein each of the first, the second, and the third slings is assembled in one point and attached to the single fitting.

11. The method according to claim 4, wherein the one of the first, the second, or the third sling that is the controlled sling is wrapped one turn about the controlled blade and the others of the first, the second, and the third slings not the controlled sling are wrapped two turns about their respective rotor blades.

12. The method according to claim 4, wherein the one of the first, the second, or the third sling that is the controlled sling is connected to the at least one fitting via an actuator without a pulley block and the others of the first, the second, and the third slings not the controlled sling are connected to the at least one fitting via a pulley block.

13. The method according to claim 1, wherein at least one of the first, the second, or the third sling is attached to the at least one fitting via a pulley block.

14. The method according to claim 1, wherein the rotor forms a flange for attachment to the drive shaft and thereby defines a rotor axis about which the rotor is configured to rotate when attached to the drive shaft, and where the rotor is carried by a stand on the surface.

15. A system for mounting a rotor to a drive shaft of a wind turbine, the rotor having a hub and a first, a second, and a third blade attached to and extending from the hub, the system comprising:
   a first,
   a second, and a third sling, wherein each of the first, second and third slings is configured to be wrapped around a root end of the first, second, and third rotor blades, respectively,
   a fitting for attaching the first, the second, and the third slings to a crane cable,
   a first pulley block disposed between the fitting and the first sling for allowing the first sling to move relative to the fitting;
   a second pulley block disposed between the fitting and the second sling for allowing the second sling to move relative to the fitting; and
   an actuator disposed between the fitting and the third sling for changing the distance between the fitting and the third sling to thereby enable controlling of the orientation of the rotor which is lifted by the first the second, and the third slings.

16. The system according to claim 15, further comprising a shield which is attachable to the rotor or to the third sling and which is suitable for protecting the rotor against contact with the third sling.

17. The system according to claim 16, wherein the shield forms a curved track for receiving slings the third sling during reorientation of the rotor.

18. The system according to claim 15, wherein the movement of the first sling relative to the first pully block is independent of the movement of the second sling relative to the second pulley block.

19. A combination, comprising:
- a wind turbine blade rotor having a hub and a first, a second, and a third blade attached to and extending from the hub; and
- the system according to claim 15 for mounting the rotor to a drive shaft of the wind turbine, wherein the first, the second, and the third slings are wrapped about the root end of the first blade, the second blade, and the third blade, respectively.

\* \* \* \* \*